United States Patent Office 3,218,460
Patented Nov. 16, 1965

3,218,460
STABILIZED SCINTILLATION COUNTER
USING PHOTOMULTIPLIER
Serge A. Scherbatskoy, 804 Wright Bldg., Tulsa, Okla.
Filed Mar. 26, 1962, Ser. No. 182,167
2 Claims. (Cl. 250—71.5)

This invention relates to scintillation counters for the detection and measurement of nuclear radiation such as alpha rays, beta rays, gamma rays, neutrons, etc., and in particular, it relates to a counter having extraordinarily improved stability.

Scintillation counters are well-known and employ a scintillating crystals or phosphor of suitable material, such as sodium iodide or cesium iodide activated with thallium, or lithium iodide activated with europium, such phosphor being optically coupled to a photomultiplier. The photomultiplier in turn is usually connected to a linear amplifier, followed by a frequency meter or a pulse height selector. The photomultiplier is a well-known device in which a photocathode produces electric current in the form of space-borne electrons responsively to impingement of light, such current being amplified in a succession of following electrodes, by utilization of secondary emission. At the output of the photomultiplier, electric pulses generated in response to light flashes impinging on the photocathode have been amplified to a significant level, such that they can be measured or amplified further by means of a conventional linear amplifier.

One of the serious difficulties that are encountered when practical application is made of scintillation counters is caused by their relative instability. The amplification in a photomultiplier tube is proportional to the 8th or even higher power of the applied voltage, and in order to have stable amplification very precise regulation of the voltage is required. In addition, photomultipliers exhibit drifts with time and temperature. Furthermore, photomultipliers of the same type are not uniform in gain and vary considerably one from the other, and if a photomultiplier is broken or damaged and then replaced by another one of the same type, the replacement tube may be quite different in gain from the previous tube and can have a gain different by a factor of 2 or 3. It is necessary therefore to calibrate scintillation counters frequently, and the calibration in the higher m.e.v. ranges is a tedious procedure because of lack of convenient standard monoenergetic sources. Good stability is especially necessary for gamma ray spectroscopy when the spectra are complex and there are no marker peaks that can be used for frequent recalibrations and corrections to the gain.

In the past, photomultipliers for scintillation counters have often been calibrated with standard light sources. A recognized procedure is first to illuminate the photocathode with a standard light source and calibrate the photomultiplier; i.e., make an output current measurement to determine the sensitivity. This measurement is then recorded on a calibration certificate or in a notebook. The photomultiplier is then illuminated with the scintillations from the scintillating crystal due to the impinging nuclear radiation and a certain signal intensity results. The output signal reading representing the magnitude of the impinging nuclear radiation is then also recorded in a notebook. By such a calibrating procedure it is possible: (a) To select photomultipliers for uniformity; (b) to correct the indications caused by measurements of the environing nuclear rays by appropriate factors that are determined from the calibration record. In these procedures, the voltages applied to the electrodes of the photomultiplier are maintained very constant and are supplied by some sort of precision regulated power supply so that, as the instrument is shifted from calibration procedures to measurement procedures, the sensitivity will not change. Such an arrangement is cumbersome and the procedures tedious, and for some applications, as for example, for continuous unattended monitoring of gamma radiation, they are completely impractical.

To overcome the difficulties caused by drifts and instabilities, I have invented a system in which the photo cathode of the photomultiplier is illuminated continuously by a standard light source of very constant intensity while the unknown radiation is being measured, and during this constant illumination the voltages supplied to the photomultiplier electrodes are varied automatically so as to readjust the gain and compensate for any drift The instrument is thus continually maintained in exact calibration. An indicator therefore can show the magnitude of the unknown radiation at its true value and no corrections are required. In order to accomplish such automatic continuous stabilization, it is necessary to separate the signal due to the standard light and the signal due to the impinging radiation, and to provide a circuit that will vary the photomultiplier gain responsively to variations in the signal derived from the standard light and not to vary the gain responsively to the signal caused by the unknown radiation. I achieve this by varying the photomultiplier dynode voltages in response to the D.C photomultiplier anode current, and my system is designed to separate the photomultiplier signal currents from the control currents caused by the standard light. Such separation is not easy to achieve since both the currents come from the same photomultiplier anode. Furthermore, the current used for control purposes increases substantially the noise in the system, so that unless a special circuit is provided the counter becomes useless due to excessive noise.

I have devised a circuit in which two channels are provided in the anode circuit; in one channel appears a voltage which is predominantly the control voltage due to the D.C. current from the standard light; in the other channel appears essentially the signal caused by the impinging unknown radiation. The design of the arrangement is such that variations in the current determining the control action have little effect on the signal developed in the channel conveying electric currents representing the unknown radiation and, conversely, variations in the signals that measure the unknown radiation have little effect on the control voltage. By the use of my invention, it is possible to provide an arrangement that will have good control characteristics and at the same time have low noise. By use of my circuit, noises as low as 6 kev, gamma ray equivalent have been achieved.

In my system the photocathode of the photomultiplier is illuminated with the constant light, and the resulting photomultiplier anode current in turn produces an output pilot signal which is used to control the voltages on the photomultiplier dynodes so as to maintain the amplification constant. Thus, variations in gain of the photomultiplier are compensated and minimized.

In order to overcome the difficulties due to drift, a relatively frequent and preferably continuous and automatic adjustment of the scintillation counter was necessary. In order to calibrate a scintillation detector and compensate for uncontrollable drift, it has been necessary in the past to interrupt the measuring process. Therefore, the detector was entirely ineffective as a measuring instrument during the time intervals used for calibration. Consequently, in the prior art during the performance of the scintillation detector, one was required to differentiate between two non-overlapping time intervals: The interval of calibration and the interval of measuring. My present invention overcomes this disadvantage and provides a continual stabilization of the instrument during the time when the measuring process is performed.

It is a purpose of my invention to compensate for changes in the operation of a scintillation detector and to provide an automatic controlling arrangement that will insure the stability of operation of the device.

Other objects, together with some of the advantages to be derived in utilizing the present invention, will become apparent from the following detailed description taken together with the accompanying drawings in which.

Figure 1:
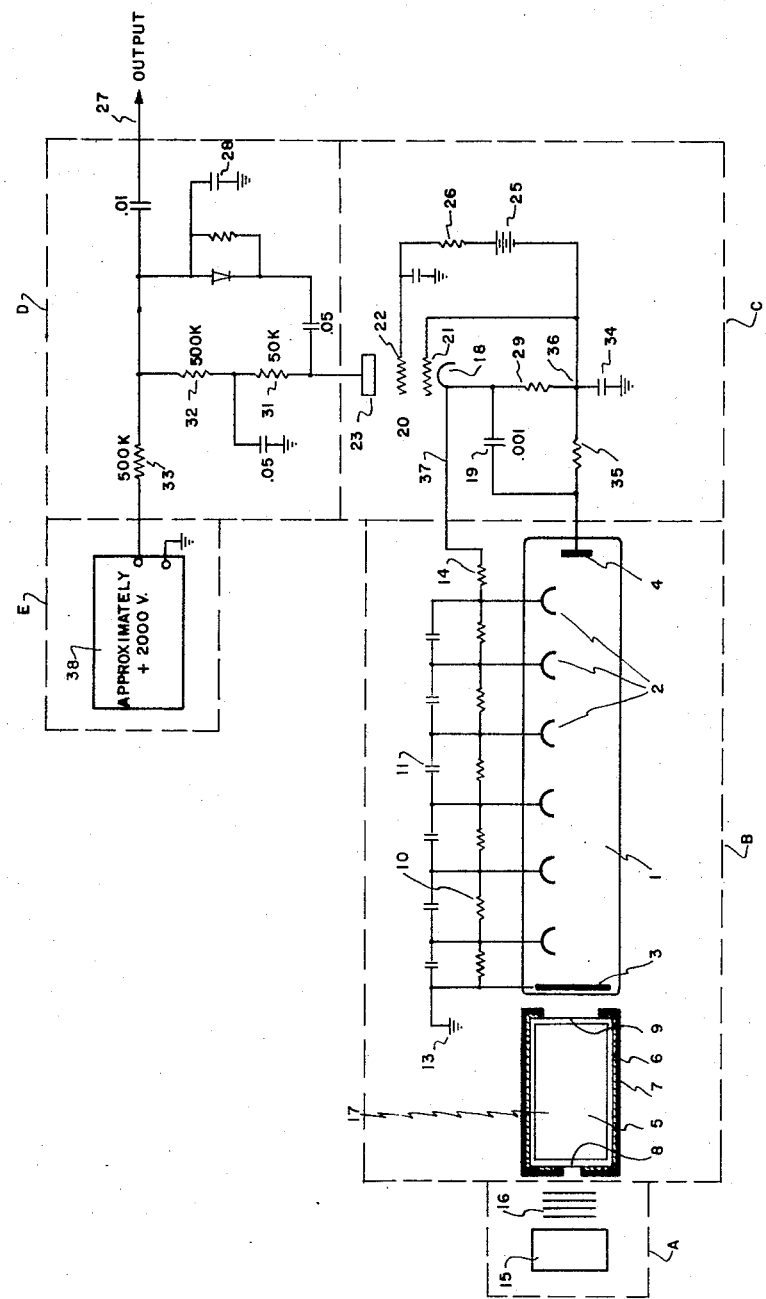
FIG. 1 shows a scintillation counter embodying the principles of my invention.

Consider now the diagrammatic arrangement of FIG. 1. Numeral 1 indicates a photomultiplier tube provided with a plurality of electrodes. Numeral 5 indicates a sodium iodide crystal. Numeral 6 indicates a case provided with an internal reflecting layer 7. Numerals 8 and 9 indicate transparent glass windows through which the crystal can be viewed. Numeral 3 indicates the photocathode, numeral 4 the anode of the photomultiplier 1 which is positioned so that the photocathode can view the light flashes through the glass window 9. The photomultiplier is provided with the conventional voltage divider network comprising resistors 10 and condensers 11 arranged so as to apply to each dynode an appropriate accelerating potential. Circuit point 13 is grounded and the last dynode is provided with a potential dropping resistor 14. The photomultiplier anode and dynodes receive their proper operating potentials through resistors 5, 29 and 14, and then through the internal resistance of tetrode 20 and the resistors 31, 32, 33 which last resistor connects to a conventional unregulated high voltage source 38.

A standard light source 15 is provided to illuminate the photomultiplier photocathode 3 through the windows 8 and 9. This standard light source emits light of very constant intensity. A preferred light source is an assembly comprising a fluorescent material such as, for example, zinc sulfide intimately mixed with an amount of radioactive material, as, for example, Hydrogen–3 or Carbon–14. It is important that the light source emit only light and not emit to its environment any nuclear rays such as gamma rays or bremstrahlung, since such nuclear rays would irradiate the crystal and interfere with the measurement of the nuclear rays coming from the outside of the instrument. It is also important that the light source be sufficiently large and comprise a sufficient quantity of radioactive material so that fluctuations in the light intensity caused by the random nature of the radioactive disintegrations be minimized. Also, it is necessary that a sufficiently large quantity of fluorescent material be employed so that fatigue caused by long-term bombardment by the nuclear rays be minimized. By suitable design, it is possible to produce a source that will be essentially free from fluctuations and constant in intensity within 1% or 2% for a period of about 10 years. The construction of such a source, and particularly the requirement that it be free of fluctuations, usually results in one of intensity substantially stronger than required. An optical diffuser and attenuator 16 therefore is interposed between the light source 15 and the window 8. This diffuser, for example, can consist of 15 or 20 layers of .01" thick Teflon. This diffuser attenuates the light from the source 15 in a way which is preferable to the attenuation which can be achieved by means of a small orifice or diaphragm which would limit the effective part of the source 15 to a small exposed area, since such limitation would accentuate the statistical fluctuations in light intensity. The diffuser 16, on the other hand, allows the whole area of the source to participate. Furthermore, in the arrangement comprising layers of Teflon, the exact light intensity required can be achieved by increasing or decreasing the number of layers of Teflon.

A special tetrode amplifier comprising tetrode 20 is provided to amplify the pulses and to regulate the dynode supply voltages. Tetrode 20 is provided with a cathode 18, a control grid 21, a screen grid 22, and a plate 23. The screen grid 22 is provided with a voltage supply comprising battery 25 and a screen resistor 26.

The operation of the device is as follows: Nuclear rays 17 from the outside of the instrument impinge upon the crystal 5 and generate scintillations or light flashes in the well-known manner. These light flashes are translated into electrical pulses which appear at the anode 4 of the photo-multiplier 1, and these electrical pulses are impressed upon the cathode 18 of the tetrode vacuum tube 20 by means of condenser 19; and since the grid 21 is at A.C. ground potential, the pulses are amplified in the vacuum tube and therefore appear as larger pulses at the plate 23.

These amplified pulses are impressed upon the output terminal 27 through the conventional pulse stretching network 28, the purpose of which is to lengthen the time duration of each pulse. The tetrode 20 and the associated pulse-stretching network 28 thus act as a pulse amplifer and generate voltage pulses at the output circuit point 27 that are proportional in magnitude to the voltage pulses appearing across the resistor 35 in the anode circuit of the photo-multiplier 1. In addition to the function of pulse amplifier, tetrode 20 also acts as a D.C. amplifier for the purpose of providing a stabilizing action by causing variation of the dynode supply voltage; and this operation is as follows: The constant light generated by source 15 produces a steady anode current in the photomilitiplier, which flows through resistor 35, through resistor 29, through the internal resistance of tetrode 20, and then through resistors 31, 32, 33 to the positive side of the high voltage supply 38. Resistors 35, 31, 32, 33 are all of relatively low resistance value as compared to resistor 29. The light intensity from light source 15 is adjusted so that the D.C. anode current of the photomultiplier is approximately $10^{-7}$ amperes and resistor 29 has a resisitance of approximately $2.10^7$ ohms. Thus the D.C. voltage drop across resistor 29 is approximately 2 volts.

Assume now that because of conditions beyond our control, such as drift, the amplification in the photomulitplier 1 doubles. The anode current therefore will tend to increase to approximately $2.10^{-7}$ amperes. This increase in current will tend to increase the voltage drop across resistor 29 to 4 volts. This increase in voltage will in turn tend to increase the negative bias on the control grid 21 of the tetrode 20, and this increase in bias will increase the internal resistance of the tetrode 20, which in turn will tend to decrease the high voltage on lead 37, which decreases the amplification of the photomultiplier. It is thus seen that any tendency of the photomultiplier gain to increase is counteracted by a decrease in the supply voltage to the dynodes, with the corresponding tendency to lower the amplification.

In order to describe more specifically the operating principle and the special considerations that are involved, it is desirable to refer again to the FIG. 1 in a more general way, and specifically to the dotted, enclosed sections defining blocks of particular function. Block A represents the very constant source of standard light which illuminates the photocathode of the photomultiplier in the scintillation counter. Block B represents a substantially conventional scintillation counter comprising a scintillating crystal and a photomultiplier with its associated voltage-divider circuit. Block C represents a control circuit for controlling the high voltage applied to the dynodes of the photomultiplier. Block D represents a circuit which lengthens the time duration of the pulses generated by the scintillation counter. Block E represents an unregulated source of high D.C. potential.

An important part of the invention consists in the voltage-controlling circuit comprised within block C. As has been described previously in detail, the operation is as follows: When the anode current increases, the voltage drop across the resistor 29 increases and this voltage drop causes in turn a corresponding increase in the internal resistance of the tube 20 and, consequently, increases the voltage drop within this tube, which in turn causes a decrease in the realized voltage at the point 37. It is seen, thus, that any increase in gain of the photomultiplier 1 causes a reduction in the value of the D.C. voltage at the point 37, which in turn tends to decrease the gain. There is thus a compensating effect tending to stabilize the gain.

Figure 2:
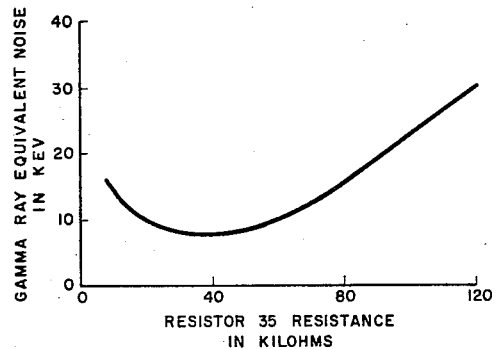
FIG. 2 shows diagrammatically the relationship between the gamma ray equivalent noise of the detector and the value of the resistance of one of the elements comprised in the detector circuit.

An important consideration is the selection of the correct ohmic value for the resistors 35 and 29. The problem consists in reducing the "noise" in the system. All scintillation counters have a certain amount of noise which determines a limit for the energy of the radiation that can be detected, and this noise can be expressed in thousands of electron volts gamma ray equivalent. Thus, if the noise in a scintillation counter system is said to be 10 kev., it is meant that the magnitude of the noise voltage pulses generated at the output of the counter is equal to the magnitude of the pulses that would be generated by 10 kev. rays impinging upon the crystal. Ordinarily, the presence of the light source in block A tends to increase the noise in the scintillation counter substantially. The D.C. current caused by the light source fluctuates, and a certain amount of noise is generated by these fluctuations. The network comprising the resistor 35, condensers 34 and 19, and resistor 29 is designed to minimize this noise. It is apparent that resistor 29 should be of very large resistance, so that very small anode currents in the photomultiplier will cause a substantial change in the grid bias of vacuum tube 20; in effect, the larger the resistor 29, the larger is the D.C. amplification in the circuit of block C. It has been determined that a value of 20 megohms for the resistor 29 is close to the optimum when a conventional tetrode is used for the vacuum tube 20. Ordinarily, the noise developed across this 20 megohm resistor would, however, be very substantial and is in the neighborhood of 60 kev. gamma ray equivalent. In order to minimize this noise, the additional resistor 35 and condenser 19 are provided. As can be seen from the circuit, the D.C. potential generated by the D.C. anode current in the photomultiplier is developed primarily across resistor 29. For A.C. signals, however, the circuit comprising resistor 35 and condenser 19 effectively shunt resistor 29 and therefore the noise pulses and signal pulses are developed primarily across resistor 35. It can be seen that the D.C. resistance from cathode 18 to photomultiplier anode 4 is equal to resistance 29+resistance 35. The high frequency A.C. resistance between cathode 18 and photomultiplier anode 4 is essentially only resistance 35, and the pulse potentials supplied to the cathode 18 are essentially developed only across resistor 35. It is seen that for pulses the circuit point 36 is bypassed to ground by the condenser 34, and the noise pulses and signal pulses are therefore developed only across resistor 35. These pulse signals are then applied to the cathode 18 through condenser 19. By careful measurements it was determined that an optimum value for resistor 35 is about 30,000 ohms, and with the circuit shown, the noise at the output 27 due to the presence of the light source in block A is of the order of 8 kev. gamma ray equivalent. With the combination of resistance 29 equal to 20 megohms and resistance 35 equal to 30,000 ohms, it is possible therefore to provide a stabilized scintillation counter that will have low noise, and therefore will be entirely satisfactory for the measurement of X-rays and gamma rays above about 50 ke The optimum ohmic value of the resistor 35 is best dete mined by experiment. It is obvious if the rise-time of the pulse amplifier circuit enclosed in block C wer infinitely short, that extremely low ohmic values for th resistor 35 would provide the best results. In practic however, the rise-time of the amplifier is finite and th various distributed capacitances in the necessary wirin; etc. are also finite. An overall measurement is therefor desirable to determine the actual noise developed at th point 27. These measurements are represented graph cally in FIG. 2 in which the abscissas represent the value of the resistance of resistor 35 and the ordinates repre sent the corresponding values of the gamma ray equivaler noise of the detector. It is seen, as a result of the measure ment illustrated in FIG. 2, that the optimum value of th resistor 35 is in the vicinity of 30,000 ohms.

Figure 3:
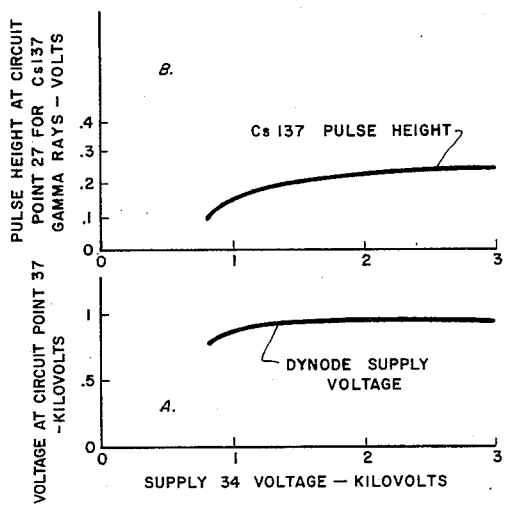
FIG. 3 shows diagrammatically the variation in the performance of the photomultiplier as a function of the magnitude of the high voltage supply.

In addition to the reduction of noise, there is the detei mination of the overall stability that can be achievec In order to determine this stability quantitatively, tw series of tests were made. In the first test the high voltag generated by the block E was varied over a wide rang and the heights of pulses caused by an external monc energetic gamma ray source (such as Cesium–137) wer measured at point 27. In a second test the D.C. voltag at point 37 was measured. Both these were plotted as function of the high voltage of block E, and the result of these measurements are shown in FIG. 3. Thes measurements are represented by means of two graph: A and B. In the graph A the abscissas represent th magnitude of the supply voltage provided by the bloc 38 in FIG. 1 and the ordinates represent the magnitude o the dynode supply voltage obtained at point 37. In th graph B the abscissas are the same as those for the grap: A and the ordinates represent the pulse height at circui point 27 obtained in response to gamma rays of Cs–13 incident upon the scintillating crystal.

Figure 4:
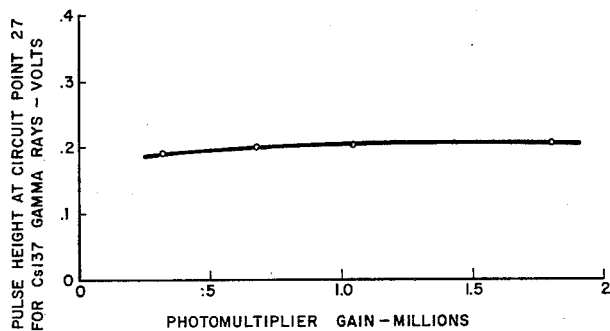
FIG. 4 shows the results of a test for determining the quantitative performance of the stabilized scintillation counter embodying the principles of my invention.

A fourth test for making quantitative performanc evaluation consists in placing into the circuit variou photomultipliers. For this purpose, 4 photomultiplier were selected having nominal "gains," as determined b the manufacturer, of 325,000; 680,000; 1,000,050; 1,800, 000. The results of these tests are illustrated diagram matically in FIG. 4 in which the abscissas represent th photomultiplier gain and the ordinates represent th height of pulses at the circuit point 27 which are obtaine when the scintillating phosphor is irradiated by Cs–13 gamma rays. It is seen from FIG. 4 that the maximur increase in pulse height for such drastic changes in th photomultiplier "gain" is of the order of 2%. In a: ordinary circuit without the compensation, replacing on photomultiplier by another having approximately 5 time the gain would result in 5 times the pulse height at th output of the scintillation counter.

The above description explains the manner of opera tion of my invention in a specific arrangement which believe is particularly adapted to a clear explanation. I1 the embodiment which I have chosen to illustrate thi invention, I have shown an arrangement in which all th the photomultiplier interelectrode potential difference are varied in order to achieve the control action. It i not necessary to vary all the interelectrode potential dif ferences, and control action can be achieved by varyin, only the potential difference between some of the photo multiplier electrodes. Quite acceptable results can b achieved by varying only the potential difference betwee1 a single pair of dynodes or between the first dynode an the cathode or between the last dynode and the anode It is apparent, for example, that by varying the potentia difference between the last dynode and the anode of th photomultiplier good control action can be achieved ove a more restricted range of supply voltage variations o photomultiplier gain variations. If it is required to achiev stabilization only over a range of photomultiplier gai1 riations corresponding to factors of 2 or 3, very satisfactory results can be achieved in controlling the scintillation counter by varying only the potential difference between the last dynode and the anode of the photomultiplier, or between an adjacent pair of dynodes. It will be apparent to persons familiar with the art that such modification and many other modifications and variations can be made without departing from the basic principle; for example, I have illustrated a control circuit employing a vacuum tube of the tetrode type. It is, of course, possible to employ a control circuit using transistors, gas discharge tubes, non-linear or linear high valued resistors, and many other types of components without departing from the principle of my invention.

I claim:

1. In a scintillation counter comprising a crystal and photomultiplier provided with a photocathode and a plurality of electrodes including an anode, a voltage source and a resistance network for supplying potential differences to said electrodes, said crystal being adapted to produce scintillations in response to irradiation by nuclear rays from the environment and said counter being adapted to perform a measurement of the intensity of said rays, a light source arranged to illuminate said photocathode with a steady, unvarying, continuous, standard illumination during said measurement, said illumination producing a D.C. photomultiplier anode current, and said scintillations producing photomultiplier anode current pulses, a first electric signal channel for selectively transmitting variations in said D.C. photomultiplier current and a second electric signal channel for selectively transmitting said pulses and means controlled by said first signal channel for automatically increasing at least one of said potential differences when said D.C. current decreases and for decreasing at least one of said potential differences when said D.C. current increases, so as to maintain the sensitivity of said counter substantially constant despite variations in the voltage of said source.

2. A scintillation counter comprising a crystal and a photomultiplier provided with a plurality of electrodes including an anode, and power-supply means comprising a resistance network, for supplying accelerating voltage differences to said electrodes, said crystal being arranged to receive from its environment bombardment by nuclear radiations of various energies and to generate scintillations in response thereto, the intensity of said scintillations being proportional to said energies, the improvement comprising in combination a light source arranged to illuminate the photocathode of said photomultiplier with a standard steady, unvarying, continuous, illumination simultaneously with said bombardment, said illumination producing D.C. photomultiplier anode current, and said scintillations producing photomultiplier anode current pulses, low-noise control means interconnecting said anode and said power-supply means and comprising a resistance-capacitance network including a condenser and a first resistor having a resistance greater than $10^7$ ohms and a second resistor having a resistance less than $10^5$ ohms, said control means being operative to develop across said first resistor a control voltage proportional to said D.C. anode current and to develop across said second resistor voltage pulses proportional in magnitude to said current pulses and essentially free of noise components due to said D.C. anode current, and means responsive to said control voltage operative automatically to increase at least one of said voltage differences when said D.C. photomultiplier current decreases, and to decrease at least one of said voltage differences when said D.C. photomultiplier current increases.

References Cited by the Examiner

UNITED STATES PATENTS

| | | | |
|---|---|---|---|
| 2,198,233 | 4/1940 | Snyder | 250—207 |
| 2,412,423 | 12/1946 | Rajchmann et al. | 250—207 |
| 2,956,165 | 10/1960 | Johnson | 250—71.5 |
| 2,957,988 | 10/1960 | Fearnside | 250—71.5 |
| 3,056,885 | 10/1962 | Scherbatskoy | 250—71.5 |

RALPH G. NILSON, *Primary Examiner.*

ARCHIE R. BORCHELT, *Examiner.*